United States Patent [19]

Takizawa et al.

[11] Patent Number: 4,709,935
[45] Date of Patent: Dec. 1, 1987

[54] REAR WHEEL STEERING SYSTEM

[75] Inventors: Shozo Takizawa, Okazaki; Kazuyoshi Kobayashi, Oobu; Kazuo Fukuyama, Okazaki; Masanori Tani, Okazaki; Shoji Yamamoto, Okazaki; Hiroo Yuasa, Nagoya; Masayoshi Nishimori, Okazaki; Hiroaki Yoshida, Okazaki; Shinichi Eto, Okazaki; Eiji Hirao, Okazaki; Masaki Goto, Nagoya, all of Japan

[73] Assignee: Mitsubishi Jidosha Kogyo Kabushiki Kaisha, Tokyo, Japan

[21] Appl. No.: 883,097

[22] Filed: Jul. 8, 1986

[30] Foreign Application Priority Data

Jul. 15, 1985 [JP] Japan .............................. 60-155522
Nov. 8, 1985 [JP] Japan .............................. 60-250495
Nov. 8, 1985 [JP] Japan .......................... 60-172085[U]
May 30, 1986 [JP] Japan .............................. 61-125276

[51] Int. Cl.⁴ ......................... B62D 5/06; B60G 7/04
[52] U.S. Cl. ...................... 280/91; 280/696; 180/140
[58] Field of Search ............. 280/661, 666, 669, 671, 280/673, 694, 699, 701, 720, 692, 91; 267/19 A, 20 A; 180/140, 141

[56] References Cited

U.S. PATENT DOCUMENTS 3,893,701 7/1975 Kroniger ...................... 280/690
4,181,322 1/1980 Kroniger ...................... 280/699
4,515,391 5/1985 Koide ........................... 280/690
4,534,435 8/1985 Shibahata et al. ............. 180/140
4,545,602 10/1985 Shibahata ..................... 280/701

FOREIGN PATENT DOCUMENTS 99470 6/1982 Japan .
2163104 2/1986 United Kingdom .

Primary Examiner—John J. Love
Assistant Examiner—Karin L. Ferriter
Attorney, Agent, or Firm—Hedman, Gibson, Costigan & Hoare

[57] ABSTRACT

A rear wheel steering system of the trailing arm type suspension for rear wheels having a trailing arm for supporting at the rear portion thereof a rear wheel and extending essentially in the longitudinal direction of a vehicle body by pivotally securing the front end thereof to the body side. Lateral arms are rotatably coupled at the outer ends thereof to the rear portion of the trailing arm and extending essentially in the lateral direction of the vehicle by pivotally securing the inner ends thereof to the vehicle body. The trailing arm allows the front portion thereof to displace essentially in the lateral direction of the vehicle. The rear wheel suspension arrangement allows the trailing arm to displace substantially in the lateral direction of the front end thereof and which comprises an actuator for steering a rear wheel by operating the trailing arm to displace the front portion of the trailing arm essentially in the lateral direction of the vehicle.

6 Claims, 20 Drawing Figures

F I G. 3
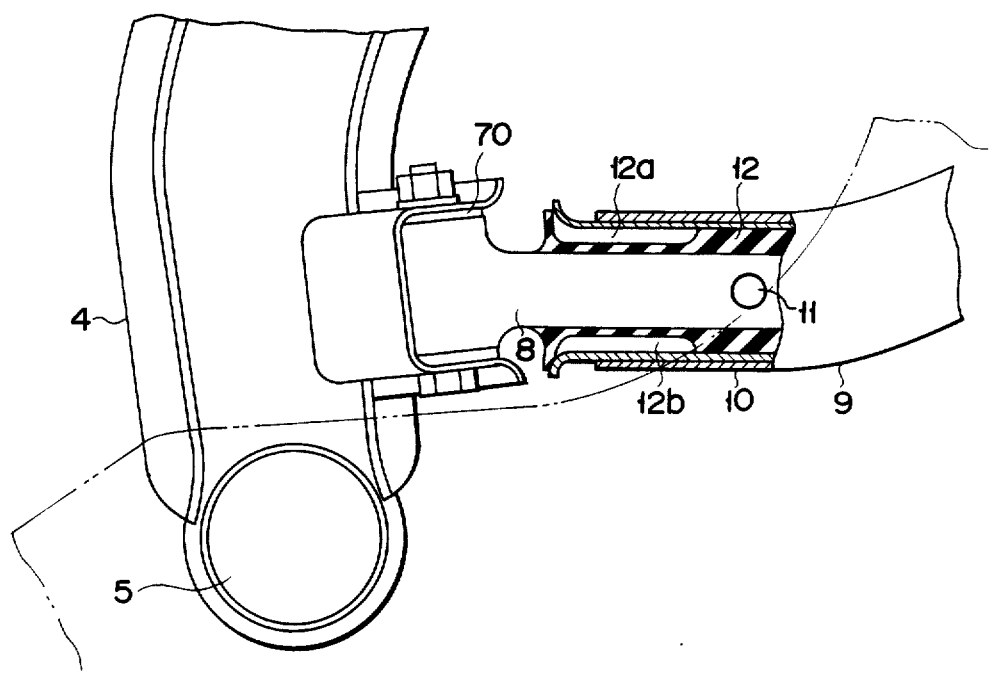
F I G. 4
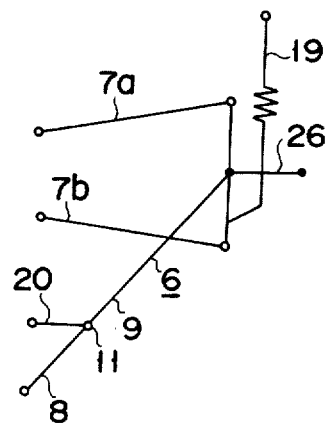
F I G. 5
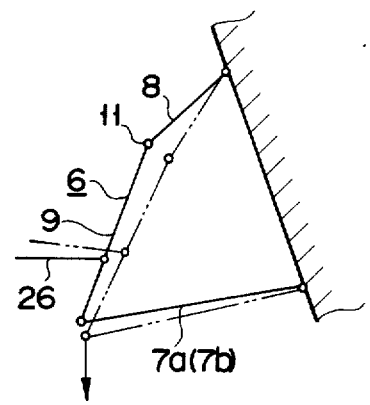

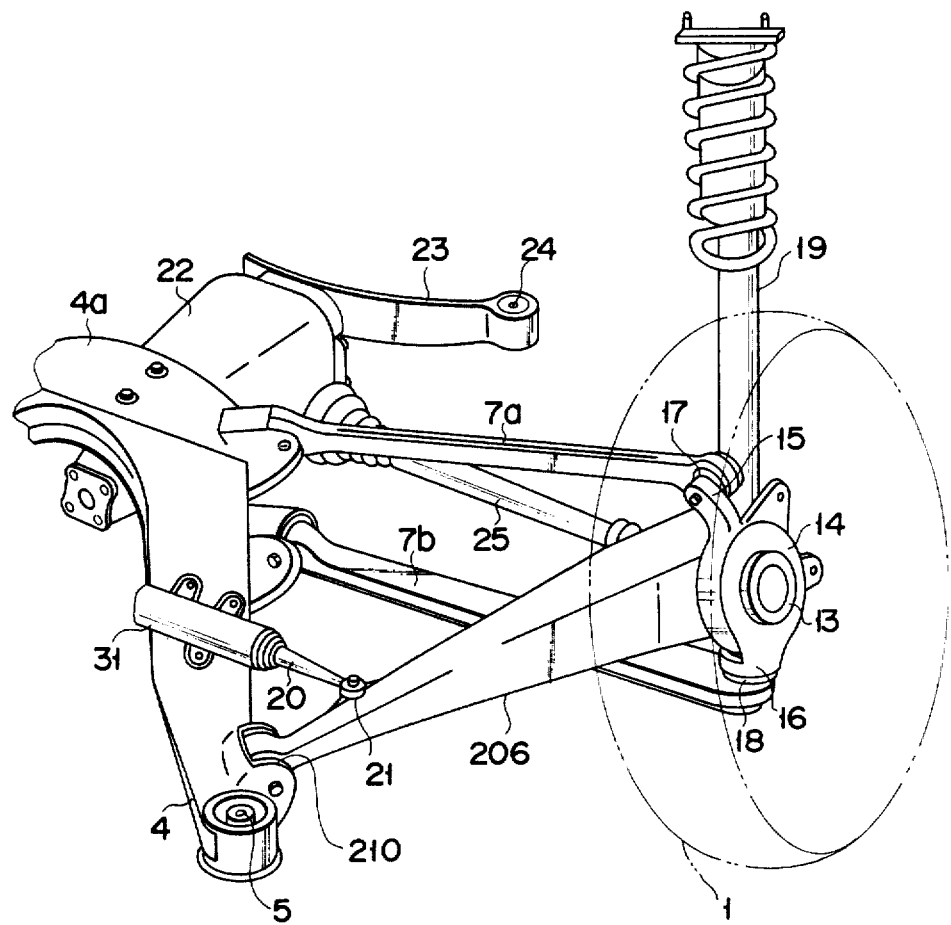
F I G. 18

REAR WHEEL STEERING SYSTEM

BACKGROUND OF THE INVENTION

The present invention relates to a rear wheel steering system applied to motor vehicles, and more particularly, to improvements in the construction of the steering system.

Recently, various systems for steering the rear wheels have been proposed with the object to improve the cornering performance or the cornering radius of a motor vehicle.

A conventional rear wheel steering system disclosed, for example, in Japanese Patent Disclosure No. 179369/85 is applied with the same construction as is in a front wheel steering system. More particularly, this type has an acutator for steering the rear wheels, a knuckle rotatably provided at a vehicle body for supporting the rear wheels, and a tie rod coupling the actuator and the knuckle for transmitting the movement of the actuator to the knuckle, thereby steering the rear wheels.

However, the conventional steering system which employs such a rotatable knuckle has the drawbacks in which a McPherson strut type suspension for rear wheels or double Wishbone type suspension for rear wheels, must be utilized which has a complicated structure thus necessitate a large space and an increased cost. Further, since this conventional system should further avoid the link interference between a suspension arm and a tie rod, it has another drawback that an ideal rear wheel suspension cannot be accomplished. A conventional rear wheel steering system which has a relatively simple structure for eliminating the above-mentioned drawback is disclosed, for example, in Japanese Patent Disclosure No. 99470/82. This steering system having a semi-trailing arm type suspension for rear wheels forcibly deforms a bushing for supporting a cross member to a vehicle body by an actuator to thereby incline the cross member and the semi-trailing arm, thereby steering a rear wheel.

However, since this steering system employs the semi-trailing arm type suspension, a laterial force acting on the rear wheel is input from a suspension arm through the cross member to the bushing. Thus, since this system needs to flexibly set the bushing so as to perform the rear wheel steering, if the hydraulic system of the actuator fails, the bushing is largely deformed by a lateral force input from the road surface to the rear wheel during cornering of the vehicle, so that the semi-trailing arm and the cross member incline with the result that so-called "a compliance steering phenomenon" for steering the rear wheels in the reverse direction to the front wheels feasibly increases to cause an oversteering to occur, thereby deteriorating steering stability. Thus, the conventional steering system has drawbacks which largely deteriorate the function as a suspension when the hydraulic system fails.

Further, since the conventional rear wheel steering system inclines the entire rear wheel suspension arrangement with respect to a vehicle body, the system has another drawback in that it requires a relatively high output actuator of large size and high cost.

Moreover, since the steering system deforms the bushing disposed separately at a long distance from the rear wheel in order to steer the rear wheel, the system has still another drawback that only a very small steering angle can be provided from the operating amount of the actuator.

SUMMARY OF THE INVENTION

It is an object of the present invention to provide a rear wheel steering system which provides an actuator for steering a rear wheel capable of reducing the toe-change of the rear wheel at swingably operating time of a rear wheel suspension upon upward and downward movements of a vehicle body during the traveling of the vehicle to improve the ride feel of the vehicle and which can restrict a compliance steering of the actuator even when the actuator fails to prevent the oversteering, thereby providing excellent safety and steering stability.

In an aspect of the present invention, there is provided a rear wheel steering system comprising a rear wheel suspension arrangement including a trailing arm for supporting at the rear portion thereof a rear wheel and extending essentially in the longitudinal direction of a vehicle body by pivotally securing the front end thereof to the body side, and lateral arms pivotally coupled at the outer ends thereof to the rear portion of the trailing arm, extending essentially in the lateral direction of the vehicle and pivotally connected at the inner ends thereof to the vehicle body, and an actuator for steering a rear wheel by operating the trailing arm to displace the front portion of the trailing arm essentially in the lateral direction of the vehicle. The trailing arm is provided to allow the front portion thereof to displace essentially in the lateral direction of the vehicle.

BRIEF DESCRIPTION OF THE DRAWINGS

FIG. 3 is a sectional view of the essential portion showing the coupled state of a vehicle body side arm and a wheel side arm of a trailing arm;

FIG. 4 is a perspective view showing the coupling state of suspension links;

FIG. 5 is a plan view of the linkage shown in FIG. 4;

FIG. 18 is a perspective view of the linkage shown in FIG. 17;

DETAILED DESCRIPTION OF THE PREFERRED EMBODIMENTS

A first embodiment of a rear wheel steering system according to the present invention will be described in detail with reference to the accompanying drawings.

Figure 1:
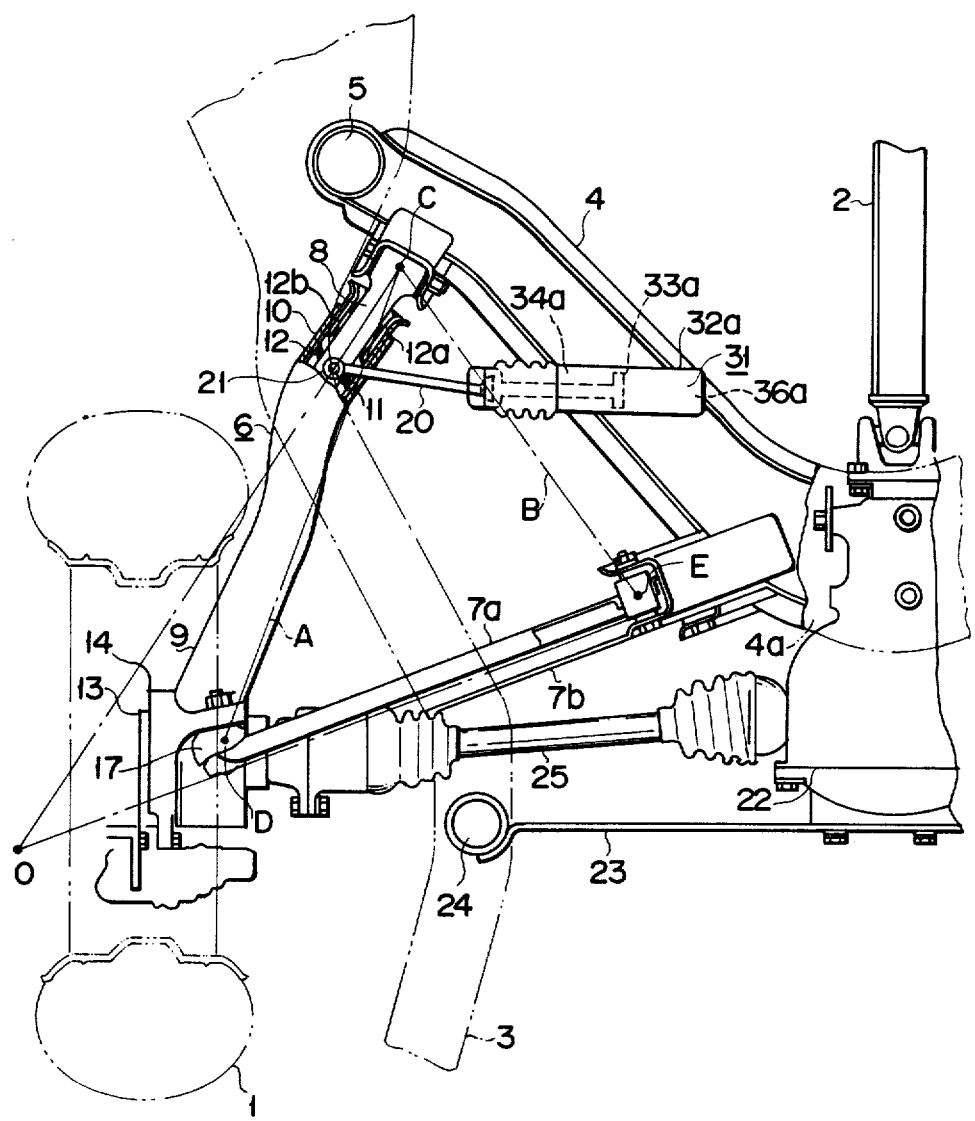
FIG. 1 is a plan view showing the construction of a first embodiment of a rear wheel steering system.
Figure 2:
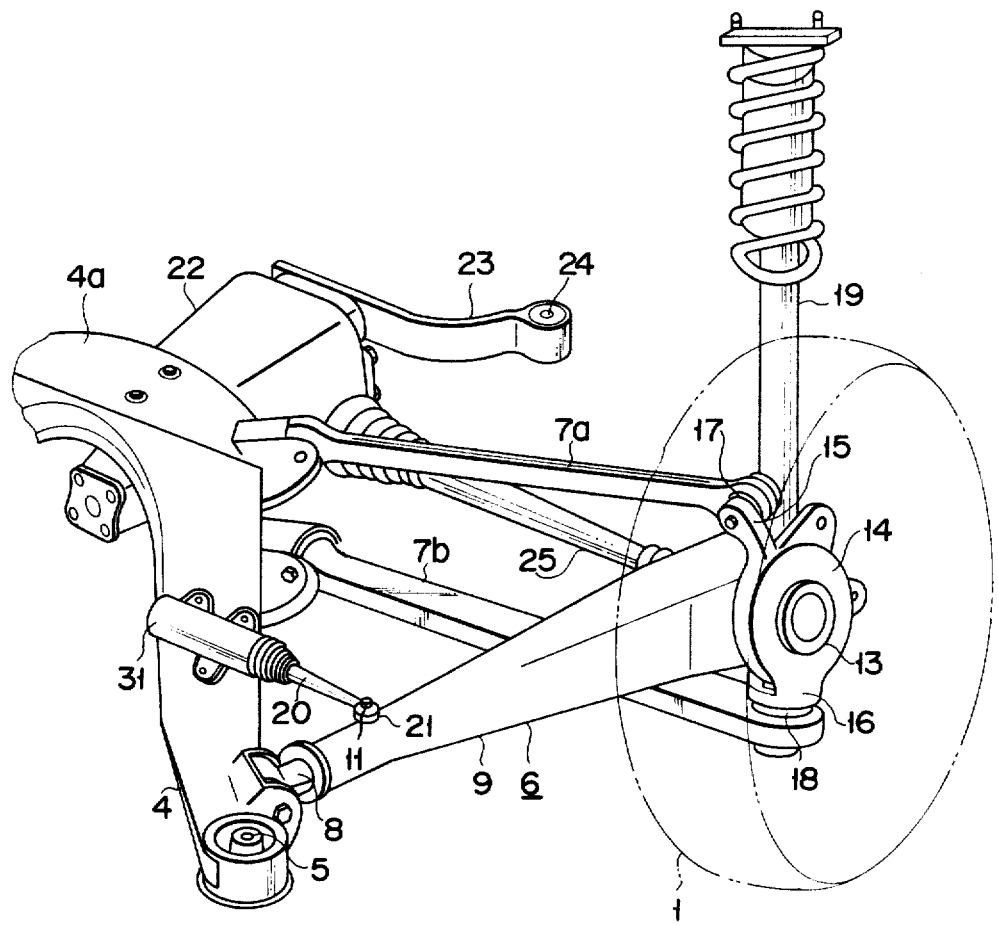
FIG. 2 is a perspective view of the linkage shown in FIG. 1.

FIGS. 1 to 6 show a first embodiment of the present invention. FIGS. 1 and 2 show the schematic construction of the essential portion of a rear wheel steering system having a rear wheel suspension arrangement. Numeral 1 designates a rear wheel, numeral 2 a propeller shaft of a vehicle body side, numeral 3 body frames, and numerals 4 a suspension cross member. Member 4 is disposed along the lateral direction of the vehicle, and mounted hingedly between a pair of body frames 3 disposed at the right and left sides of the vehicle body. Further, cross member 4 is bent in the state that the central portion side is bent to the vehicle body rear side. In this case, member 4 is mounted at body frames 3 side through cross member bushings 5 formed of a resilient material. Numeral 6 designates a trailing arm for supporting a rear wheel 1, and 7a and 7b are a pair of upper and lower lateral arms or links extending essentially in the lateral direction of the vehicle. Arm 6 is split into vehicle body side arm 8 pivotally secured to the vehicle body side and wheel side arm 9 for supporting rear wheel 1. In this case, arm 8 is disposed in the lateral inside of the vehicle with respect to arm 9. Moreover, arm 9 is formed at the front end thereof with hollow cylinder 10 as shown in FIG. 3, and the rear end side of rod-shaped arm 8 is inserted into cylinder 10. The front end side of arm 8 is resiliently pivotally secured to member 4 through bushing 70 formed of a resilient material. Further, rotary shaft 11 is mounted in a penetrated manner between the rear end side of arm 8 and cylinder 10 of arm 9. Shaft 11 is disposed in essentially a vertical direction, with respect to arm 9, and the rear end side of arm 8 and cylinder 10 of arm 9 are rotatably connected therebetween at shaft 11 as a center. Further, bushing 12 formed of a resilient material is interposed between cylinder 10 of arm 9 and the rear end side of arm 8. A pair of recesses 12a and 12b are formed on both sides of bushing 12 in the horizontal surface, and arm 9 and arm 8 can relatively rotate at shaft 11 as a center. Thus, arm 6 formed of arm 8 and arm 9 is allowed to displace at the front portion thereof in the lateral direction of the vehicle by the relative rotation of the arms 8 and 9 generated by deforming bushings 12 and 70. Furthermore, essentially cylindrical axle housing 13 and hub carrier 14 engaged with the outer periphery of housing 13 are integrally fixed to the rear end of link 9. Upper support 15 for pivotally securing upper link 7a of the lateral arms is formed on the upper portion of hub carrier 14, and lower support 16 for pivotally securing lower link 7b of the lateral arms is formed on the lower portion of hub carrier 14. Moreover, the outer end of upper link 7a of the lateral arms is pivotally secured to upper support 15 of hub carrier 14 through ball joint 17, and the inner end of link 7a is resiliently pivotally secured to the vicinity of rear projection 4a of the end of the bent portion of member 4 of the vehicle body side through a bushing formed of a resilient material. Link 7b of the lateral arms is also pivotally secured essentially similarly to link 7a at the outer end thereof to the lower support 16 of hub carrier 14 through ball joint 18, and resiliently pivotally secured at the inner end of link 7b to the vicinity of rear projection 4a of the end of the bent portion of member 4 of vehicle body side through a bushing formed of a resilient material. Thus, the rear portion of arm 6 is supported to the vehicle body through a pair of upper and lower lateral arms 7a and 7b, but is not allowed to displace in the lateral direction of the vehicle like the front portion of arm 6. Therefore, when the front portion of arm 6 is displaced in the lateral direction of the vehicle, arm 6 rotates at the pivotally securing point of the rear portion of arm 6 and arms 7a, 7b serving essentially as a center. Further, a coupling portion between arms 7a, 7b and member 4 of the vehicle body side is disposed at the front side of the vehicle body from the coupling portion of arms 7a, 7b and arm 9 side. Linkage of quadric crank chain as shown in FIGS. 4 and 5 is composed of arm 8 of arm 6, arm 9 and the lateral arms 7a, 7b, and a wheel support is supported swingably in upward and downward directions at the swinging center line of the wheel support for connecting a first coupling portion between arm 8 and the vehicle body side to a second coupling portion between arms 7a, 7b and the body side as a center. Further, the coupling portion of link 7a of the lateral arms and arm 9 side is disposed at the forward side of the vehicle body from the coupoling portion of link 7b and arm 9 side, and disposed in the inside of the lateral direction of the vehicle. Further, a shock absorber bracket is formed at the rear end of arm 9, and the lower end of a strut type shock absorber 19 is connected directly to the bracket.

On the other hand, the outer end of tie rod 20 is connected through ball joint 21 to shaft 11 for rotatably connecting between arm 8 and arm 9. The inner end of rod 20 is rotatably connected to piston 33a of actuator 31 provided at member 4 for steering the rear wheel.

Further, the connecting position of rod 20 to arm 6 is, as shown in FIG. 1, disposed within the horizontal plane of the vehicle, at the position near a line A for connecting the vehicle body side pivotally securing central point C of arm 6 and the connecting point center D of arm 6 and link 7a, and the connecting position of rod 20 to actuator 31 is disposed in the horizontal plane of the vehicle on a line B for connecting the central point C to the vehicle body side pivotally securing central point E of link 7a.

A differential unit 22 is mounted at rear projection 4a of the end of the bent portion of member 4. Unit 22 is supported at the rear end thereof by differential support member 23 mounted hingedly between right and left body frames 3. Further, member 23 is resiliently connected to frame 3 side through differential support member bushing 24 formed of a resilient material. Numeral 25 designates a drive shaft, and numerals 26 a wheel spindle of the rear wheel.

The actuator 31 for steering the rear wheel described above is, as shown in FIG. 6, formed of pistons 33a, 33b of hydraulic power cylinders 32a, 32b, and disposed on the inner side of the right and left rear wheel. Further, left chambers 34a, 34b of cylinders 32a, 32b communicate through connecting conduit 35 therebetween, and right chambers 36a, 36b of cylinders 32a, 32b communicate through a connecting conduit 37.

Figure 6:
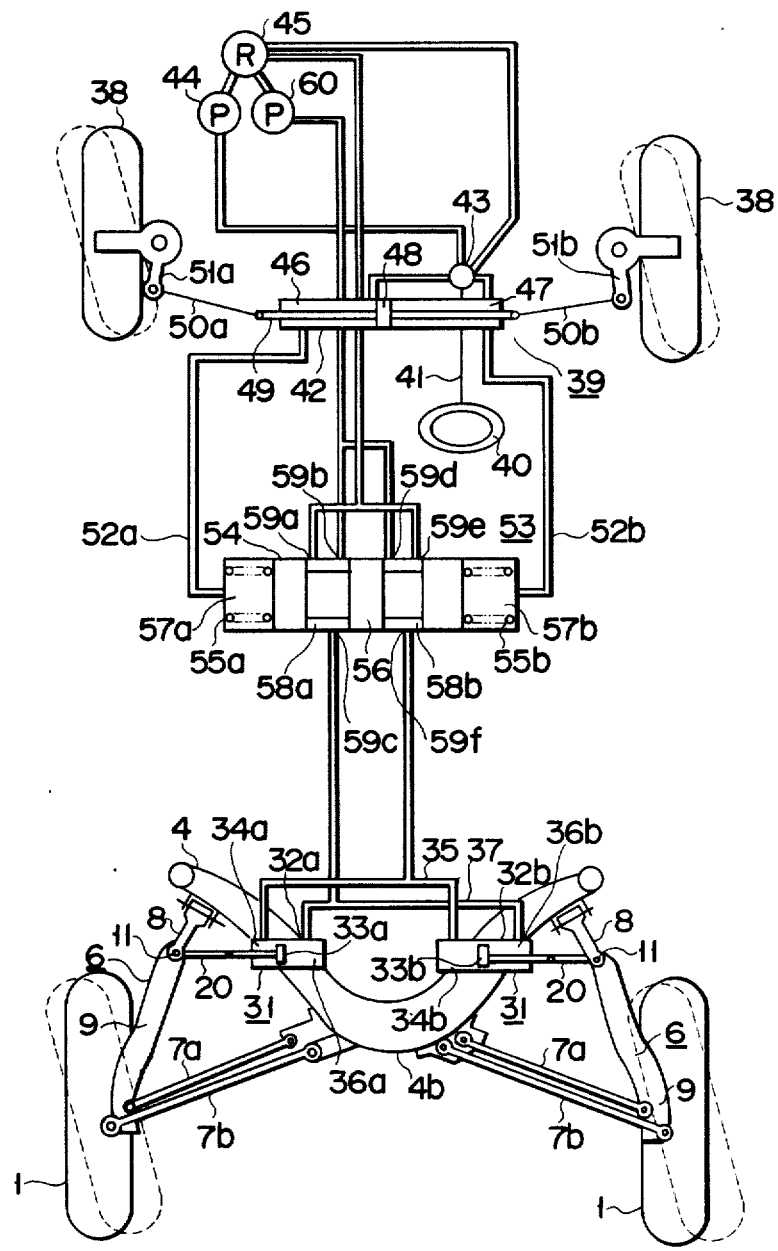
FIG. 6 is a schematic view showing a hydraulic circuit for driving an actuator for steering a rear wheel.

FIG. 6 shows a hydraulic circuit for driving actuators 31 for steering rear wheels. Numerals 38 designate front wheels, numeral 39 a steering system having a power steering unit, numeral 40 a steering wheel. Wheel 40 is connected through a shaft 41 to control valve 43 of power cylinder 42. Valve 43 is connected with pump 44 for power steering, reservoir tank 45, and left and right chambers 46, 47 of cylinder 42. Further, both ends of piston rod 49 of piston 48 for partitioning between chambers 46 and 47 of cylinder 42 are connected through tie rods 50a, 50b to knuckle arms 51a, 51b for supporting the front wheels.

Further, cylinder 42 is connected through conduits 52a, 52b to hydraulic pressure switching valve 53. In this case, valve 53 is contained in valve body 54 to be axially movable in the body 54, and formed of a spool 56 having springs 55a, 55b at both right and left ends thereof. Left and right valve chambers 57a, 57b are respectively provided at the left and right sides of valve body 54, and chambers 57a and 57b are connected therebetween through a conduit 52a, and right valve chamber 57b of valve 53 and right chamber 47 of cylinder 42 are connected therebetween through conduit 52b. Moreover, a pair of small-diameter portions are formed at the center of spool 56, and first and second valve chambers 58a, 58b are respectively formed in body 54 by the small-diameter portions. Chamber 58a is formed with first port 59a, second port 59b and third port 59c, and chamber 58b is formed with fourth port 59d, fifth port 59e and sixth port 59f. Ports 59a, 59e are connected to tank 45, and ports 59b, 59d are connected to a pump 60 for steering the rear wheel. Pump 60 is driven by a drive force from the output shaft of a transmission, not shown, and formed of a vehicle speed proportional pump for discharging work oil of flow rate corresponding to the vehicle speed. Further, port 59c is connected to conduit 37, and port 59f is connected to conduit 35.

The operation of the first embodiment described above will be described in detail.

The steering operation of the rear wheel will be first described. Since wheel 40 is held in the neutral state at a linearly traveling time of the vehicle, the front wheel is held, as shown by solid lines in FIG. 6, in a linearly traveling state. Pressures acted on both pressure chambers of actuator 31 for steering the rear wheel become equal in this state, pistons 33a, 33b are held at neutral position in cylinders 32a, 32b, and the rear wheel is held as designated by solid lines in FIG. 6 in a linearly traveling state. When the vehicle traveling in a relatively high speed state is, for example, turned to the left side in FIG. 5, valve 43 of cylinder 42 is driven in cooperation of the steering operation of wheel 40, and piston 48 in cylinder 42 is moved rightward in FIG. 6. Further, as piston 48 moves, knuckle arms 51a, 51b turn to the left through rods 50a, 50b connected to both ends of rod 49 to steer the front wheels 38 to the left as shown by broken lines in FIG. 6. As piston 48 in cylinder 42 moves, part of the working oil in a high pressure state in left chamber 46 of cylinder 42 is introduced through conduit 52a to left chamber 57a of valve 53 as pilot signal pressure. Thus, since spool 56 in valve 53 moves rightward in FIG. 6 so that ports 59a, 59d are closed, oil discharged from pump 60 is fed through port 59b into chamber 58a, further from chamber 58a through port 59c and conduit 37 to right chambers 36a, 26b of cylinders 32a, 32b. Accordingly, pistons 33a, 33b in cylinders 32a, 32b move leftward in FIG. 6. Thus, shaft 11 disposed at the front portion of arm 6 is moved leftward through rods 20, arms 8 and 9 relatively move therebetween at shaft 11 as a center, and as arm 9 rotates, the rear wheel 1 is steered leftward of the same side as the front wheel as designated by broken lines in FIG. 6 to generate an understeering trend at the vehicle. In this case, oil in left chambers 34a, 34b of cylinders 32a, 32b is sequentially returned through conduit 35, port 59f, chamber 58b and port 59e into tank 45. Further, when the vehicle traveling in a relatively high speed state is turned to the right in FIG. 6, the rear wheels are steered in the same direction as the front wheels essentially in the same operation.

When the traveling speed of the vehicle is relatively low, since the discharging oil pressure of pump 60 for steering the rear wheel is low, actuator 31 cannot perform a force for steering the rear wheel, and does not steer the rear wheel. In the arrangement described above, since the linkage of quadric crank chain for exerting the toe-change of the rear wheel by moving the position of spindle 26 of the rear wheel as arm 9 and arm 8 is relatively rotated at shaft 11 for connecting between link 8 of arm 6 and arm 9 as a center are composed of link 8 of arm 6 and the lateral arms 7a, 7b as shown in FIG. 5. Only the front portion of arm 6 can displace in the lateral direction of the vehicle by the operation of the linkage of quadric crank chain, thereby enabling to change the rear wheels angle or the toe angle. Thus, the operation for steering the rear wheel as described above can be not only exerted, but relative rotation between arm 9 and arm 8 is exerted at shaft 11 as a center by the backward force when the backward force is acted on the vehicle body such as, for example, in the state for not steering the rear wheels at linearly traveling or low speed time, and the linkage of quadric crank chain is deformed upon the rotation from the normal position to the toe-in position designated by two-dotted chain line in FIG. 5, thereby exerting the toe-change in the rear wheels.

Further, since the above-mentioned suspension has the lateral arms extending in the lateral direction of the vehicle by supporting the rear portion of the trailing arm, the compliance steering occurred by the lateral force acting on the rear wheel at the vehicle cornering time is in general small and superior to the steering stability. Since the above-mentioned suspension has the coupling portion between arms 7a, 7b and member 4 of the vehicle body side disposed at the front side of the vehicle body from the coupling portion of arms 7a, 7b and arm 9 side, the momentary central point O of the suspension arms formed of the crossing point of the center line of arm 8 of arm 6 and the center line (the center line between the central line of link 7a and the central line of link 7b) of the lateral arms is disposed on the rear side of the axle and on the outside of the lateral direction of the vehicle from the center of the wheel.

Thus, even if the hydraulic system for controlling the operation of actuator 31 for steering the rear wheel fails, arms 9 and 8 are relatively rotated at shaft 11 as a center by the lateral force acting from the externally cornering side on the rear wheel at the vehicle cornering time, and the linkage of quadric crank chain is deformed by the rotation to provide the toe-in operation on the rear wheel of the outer wheel and the toeout operation on the rear wheel of the inner wheel side. Even if the hydraulic system of actuator 31 fails, the oversteering phenomenon of the vehicle can be effectively prevented at cornering time by the suppressing action of the compliance steering due to the above operation and the lateral arms. The toe angle change amount of the rear wheel obtained in this case is, of course, smaller than the steering angle of the rear wheel obtained by the operation of actuator 31.

Further, since the coupling portion of arm 6 side in the horizontal plane of the vehicle is disposed in the vicinity of the line A in FIG. 1 and the coupling portion of actuator 31 side is disposed on the line B in FIG. 1, rod 20 is effectively prevented from interfering via linkage in case of upward and downward strokes of the suspension, thereby preventing the toe angle from varying at the upward and downward strokes of the suspension by the influence of the rod 20.

In addition, even if rod 20 is not disposed as described above, since the front portion of rod 20 has a degree of displacing freedom toward the lateral direction of the vehicle, the linkage interference can be absorbed by the displacement. In this case, as the suspension moves upward or downward while the vehicle travels, the entire suspension moves upward or downward so that the vehicle body moves from the normal position in the upward or downward direction, with the result that when the wheel support moves swingably upward and downward at the swinging center line of the wheel support for connecting between the vehicle body side coupling portion of arm 6 and the body side coupling portion of arms 7a, 7b as a center, the relative rotation between arm 8 and arm 9 can be suppressed by rod 20. Thus, the toe-change of the rear wheel 1 by the upward or downward movement of the vehicle body can be suppressed.

Since the coupling portion between arms 7a, 7b and member 4 is disposed at the front side of the vehicle body from the coupling portion between arms 7a, 7b and arm 6 side in the above-mentioned suspension, arms 7a, 7b are disposed obliquely to the lateral direction of the vehicle, and actuator 31 is disposed at member 4, the entire suspension arrangement including the rear wheel steering system can be reduced in size.

Further, since the front end side of arm 6 is resiliently pivotally secured to member 4 through the bushing, the inner ends of arms 7a, 7b are resiliently pivotally secured through the bushing to the vicinity of the rear projection 4a of the end of the bent portion of member 4, and actuator 31 is mounted at member 4, the rear wheel suspension arrangement and the rear wheel steering actuator can be mounted on member 4 before mounting member 4 at frame 3 side. Thus, the workability of assembling tthe body can be improved. Further, since the center of member 4 is bent to the rear side of the body, the unit 22 can be mounted on the projection 4a of the front end of the bent portion of member 4, thereby improving the workability.

According to the first embodiment described above, arm 6 extending essentially in the lateral direction of the vehicle is split into arm 8 and arm 9, and the rear portion of arm 6 is supported to the body side by arms 7a, 7b extending essentially in the lateral direction of the vehicle, the suspension itself has the action of suppressing the compliance steering and of preventing the oversteering, and allows the displacement of the front portion of arm 6 in the lateral direction of the vehicle while exerting the toe-in operation for the brake force. Thus, the rear wheel can be steering merely by mounting rod 20 and actuator 31 in the suspension to perform the rear wheel steering system with a simple construction.

Further, since the suspension itself has the abovementioned preferable operations, even if actuator 31 has, for example, failed or the hydraulic system is defective, it can effectively prevent the difficulty of remarkably losing the traveling stability, thereby providing excellent safety.

Moreover, the specifications of the vehicles having the rear wheel steering system and having no rear wheel steering system can be settled merely by selecting rod 20, actuator 31 and hydraulic circuit by using the above-mentioned suspension, thereby providing excellent productivity of the vehicles having different specifications.

In addition, according to the first embodiment described above, since the front portion of arm 9 of arm 6 for supporting the rear wheel 1 at the rear portion is displaced directly in the lateral direction of the vehicle by actuator 31 to steer rear wheel 1, and arm 9 is supported at the rear portion thereof to arms 7a, 7b via the ball joint, the steering angle of the rear wheel for the working amount of the acutator can be increased as compared with the conventional steering system, and the force of actuator 31 is reduced to reduce the size of the actuator and hydraulic circuit.

Since actuator 31 displaces the vicinity of connecting point of arms 8, 9 of arm 6 through rod 20, the response of the rear wheel to the steering for the operation of actuator 31 can be accelerated to provide excellent driverability.

Further, since the coupling portions of both ends of rod 20 are disposed near lines A, B for connecting the pivotally securing portions of arm 6 and the coupling portion of the trailing arm side of arms 7a, 7b and the body side coupling portion in the horizontal plane to prevent links 7a, 7b and rod 20 from interfering, smooth suspension strokes can be provided and the steering angle of the rear wheel can be adequately controlled.

Moreover, since arms 6, 7a, 7b and actuator 20 are fixed to member 4, the rear wheel steering system including the suspension can be reduced in size and provide excellent workability of assembly.

Figure 7:
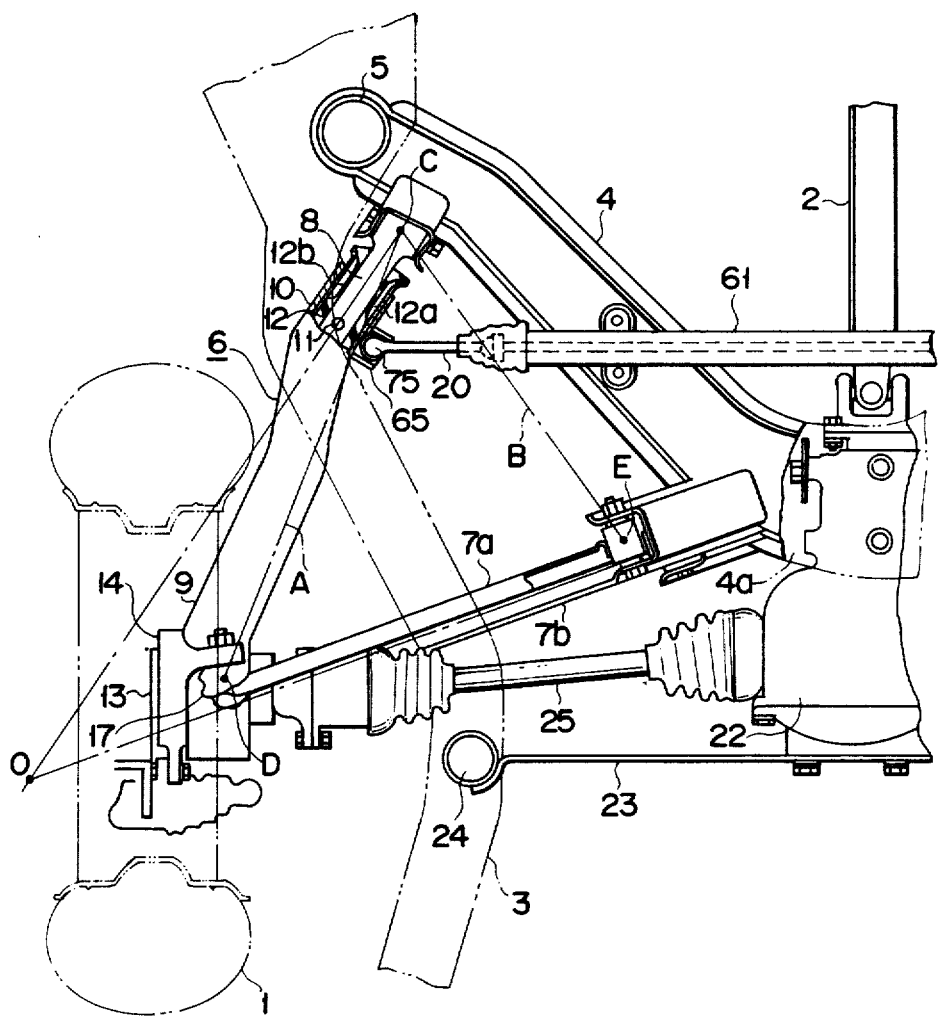
FIG. 7 is a plan view showing a second embodiment of a rearwheel steering system according to the present invention.
Figure 8:
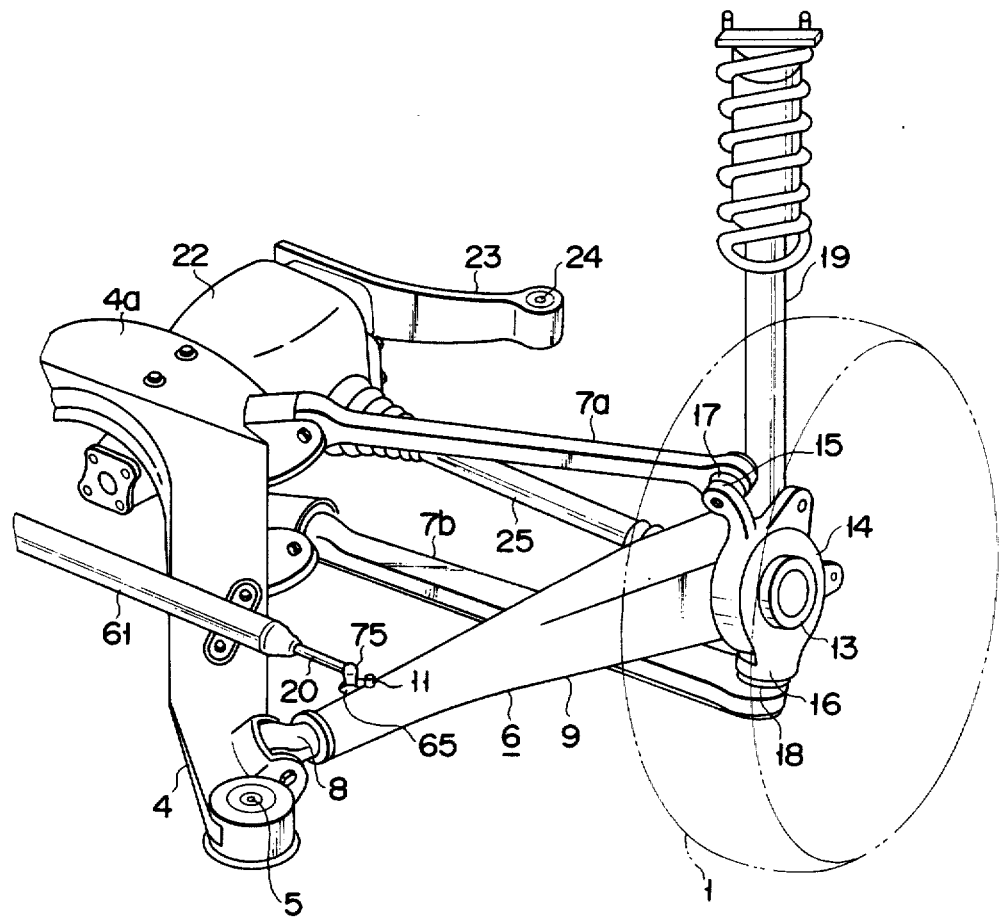
FIG. 8 is a perspective view of the linkage shown in FIG. 7.
Figure 9:
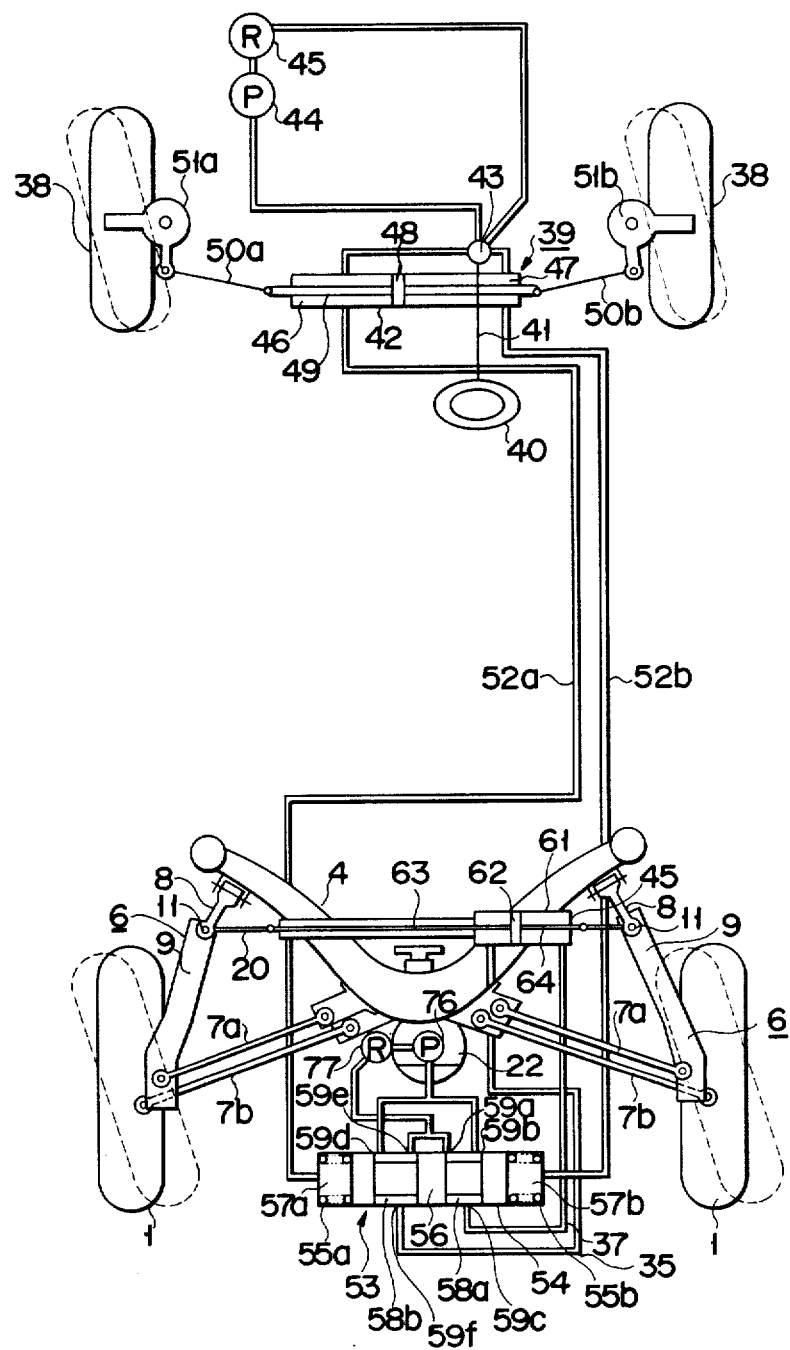
FIG. 9 is a schematic view showing a hydraulic circuit for driving an acutator for steering a rear wheel.
Figure 10:
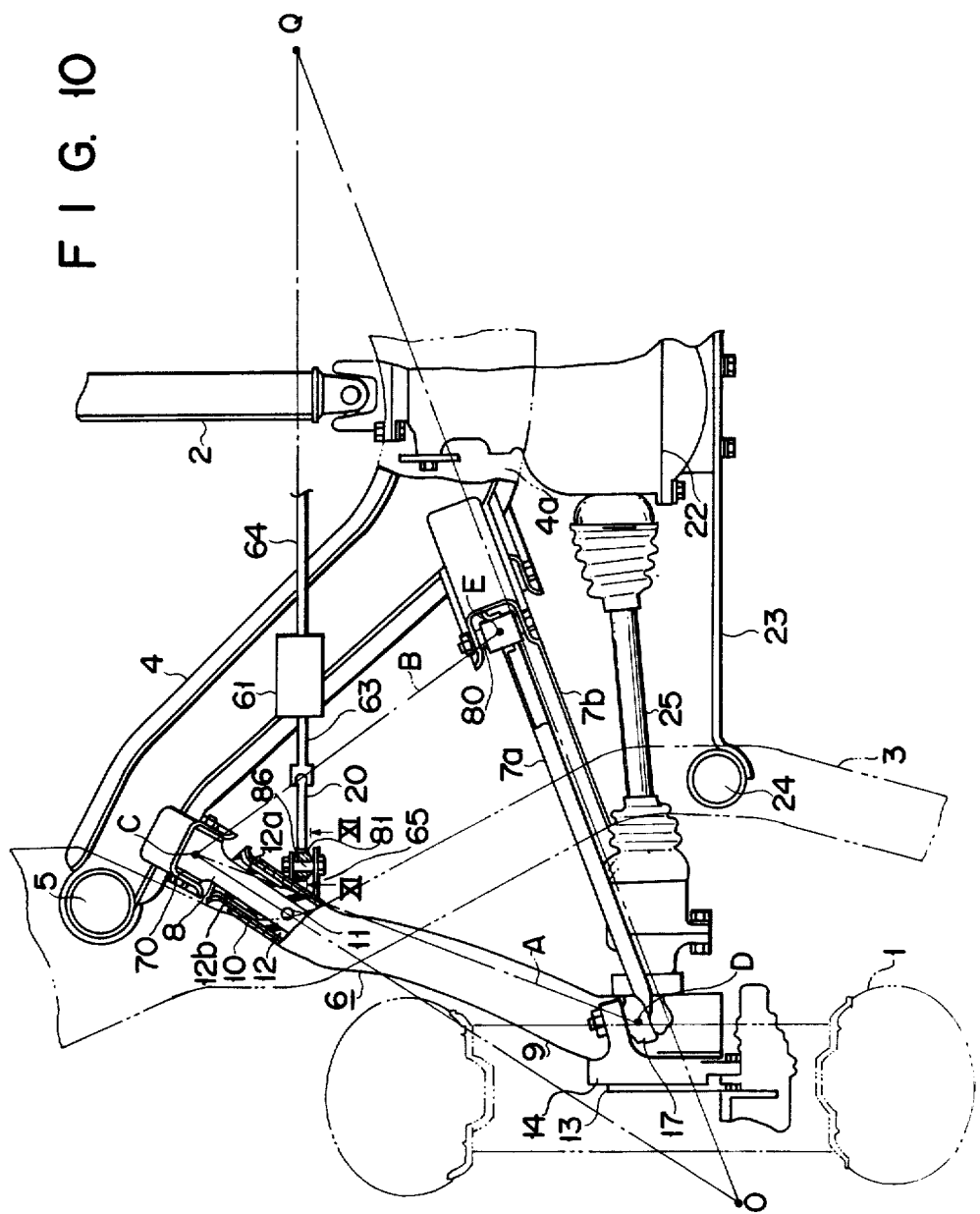
FIG. 10 is a plan view showing the schematic construction of a third embodiment of a rear wheel steering system according to the present invention.

FIGS. 7 to 9 show a second embodiment of the present invention, wherein the same reference numerals as in the first embodiment denote the same parts in the second embodiment, and the detailed description thereof will be omitted.

In this embodiment, actuator 61 for steering a rear wheel is formed of piston 62 of a hydraulic cylinder, and right and left rear wheels are respectively coupled integrally with piston rods 63, 64 for driving the rear wheels. In this case, the inners ends of rods 63, 64 are secured to piston 62, and the outer ends are rotatably connected to the inner ends of right and left tie rods 20. Further, the outer ends of rods 20 are connected through bracket 65 and ball joint 75 to the outer surface of vehicle body side arm 9 near a rotary shaft 11.

A pump 76 for steering the rear wheel is mounted in a differential unit 22, and driven by a gear in unit 22 to discharge work oil of flow rate proportional to the vehicle speed. A reservoir tank 77 exclusive for steering the rear wheel is provided near pump 76. Hydraulic switching valve 53 is composed similarly to that of the first embodiment, as pump 76 of a hydraulic pressure source is mounted in unit 22, and the valve is disposed at the rear of the vehicle.

According to the steering system described above, sine actuators 61 for driving right and left rear wheels are formed of piston 62 of a sole hydraulic cylinder, its cost can be reduced as compared with the conventional one using a pair of hydraulic cylinders. Further, when an external force is applied from the road surface to the rear wheel, no leakage of the oil in the right and left hydraulic cylinders or individual operations (the toe-change) of the right and left rear wheels due to the compression of the oils can be eliminated to enhance the stability of operation.

Further, since pump 76 for steering the rear wheel is mounted in unit 22, a distance between pump 76 and actuator 61 can be shortened to shorten the length of the hydraulic conduit to shorten the conduit space, to reduce the cost, and to decrease the pressure loss, thereby improving the safety.

According to the second embodiment as described above, the same advantages as those of the first embodiment can be provided, less expensive and excellent operating stability as compared with the first embodiment can be provided to improve the space efficiency and the safety, thereby reducing the pressure loss.

FIGS. 10 to 14 show a third embodiment of the present invention, wherein the same reference numerals as in the first and second embodiments denote the same parts in the third embodiment, and the detailed description thereof will be omitted.

Figure 11:
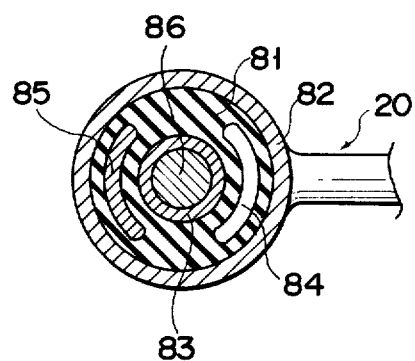
FIG. 11 is a sectional view of a bushing taken along the line XI—XI with arrows in FIG. 10.
Figure 12:
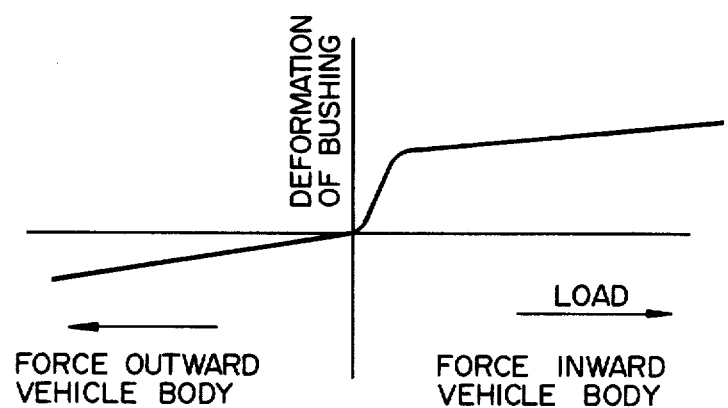
FIG. 12 is a graph showing the characteristic curve of a bushing.

The outer end of tie rod 20 is pivotally secured to bracket 65 fixed to the vicinity of a rotary shaft 11 of a vehicle body side arm 9 through bushing 81. Rod 20 is disposed at its axis toward the lateral direction of the vehicle, and crossing point Q between the extension line of the central axis of rod 20 and the extension line of the central axis of the lateral arms (see FIG. 13) is disposed in the inside of the lateral direction from the center of the rear wheel. The inner end of rod 20 is connected directly to piston rod 63 of actuator 61 for steering the rear wheel through a ball joint. Further, actuator 61 operates integrally with a piston rod 64 connected directly to the right wheel side, not shown, with a piston rod 63 in the same manner as the second embodiment. Bushing 81 interposed between rod 20 and arm 9 has a construction as shown in FIG. 11. Bushing 81 is engaged within outer cylinder 82 formed at the outer end of rod 20, and provided at rod 20 in the shape that pivotal shaft 86 mounted at rod 20 is internally engaged within an inner cylindrical collar 83. The portions disposed in the inside of bushing 81 in the lateral direction of the vehicle are cut out partly to form cavities 84 therein, the steel insert 85 is engaged within the cavity disposed in the outside of bushing 81 in the lateral direction of the vehicle. Thus, bushing 81 has a small spring constant for a force directed in the inward direction of the vehicle body acting on pivotal shaft 86 and large spring constant for a force directed in the outward direction of the vehicle body. In other words, the characteristic between the load applied to bushing 81 and the deformation of bushing 81 is as shown in FIG. 12. Thus, bushing 81 allows arm 6 to displace inward of the vicinity of shaft 11 in the lateral direction of the vehicle and restricts the displacement in the outward direction of shaft 11 in the lateral direction of the vehicle.

On the other hand, bushing 70 interposed between vehicle body side arm 8 and cross member 4 has a spring constant set larger than that of bushing 81 at cavity 84 side and smaller than that of bushing 81 at steel insert 85 side, and set so that the vicinity of shaft 11 of arm 6 may displace to the vehicle side in the axial direction of arm 8. A pair of bushings 80 interposed between a pair of upper and lower lateral arms 7a, 7b and cross member 4 have resilience sufficiently larger than bushing 70.

Figure 13:
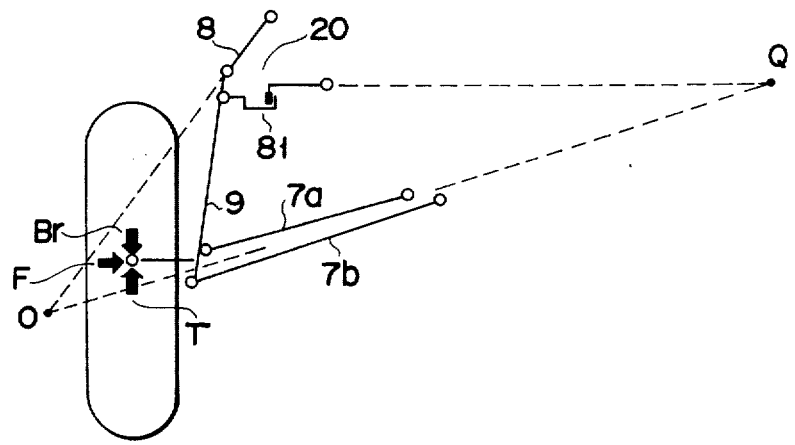
FIG. 13 is a diagram showing the schematic construction of the suspension arrangement.

The rear wheel suspension arrangement of the third embodiment is schematically shown in FIG. 13. The arrangement of a hydraulic system for controlling the operation of actuator 71 uses those shown in FIG. 6 or 9.

The operation of the third embodiment will be described in detail.

When brake force Br or lateral force F is acted on the rear wheel, the vicinity of rotary shaft 11 of arm 6 displaces by the operation of the moment around momentary central point O, and the rear wheel is exerted in toe-in effect in the same manner as the first embodiment. Since the displacement of the vicinity of shaft 11 of arm 6 in the inward direction of the vehicle body at this time is absorbed by the displacement of bushing 81 toward cavity 84 side, the toe-in operation of rear wheel 1 is not disturbed by rod 20, and the toe-in operation of rear wheel 1 is provided for brake force Br and lateral force F in the same manner as the first embodiment. Further, when forward force T is acted by the drive force to rear wheel 1 at vehicle starting and accelerating time, the vicinity of shaft 11 of arm 6 is displaced in the outward direction in the lateral direction of the vehicle by the operation of the moment around momentary central point O so that rear wheel 1 tends to exert toe-out operation, but the vicinity of shaft 11 of arm 6 is connected directly to the vehicle body side by rod 20 through actuator 61, and since bushing 81 operates to restrict the displacement of the vicinity of shaft 11 in the outward direction of the vehicle by insert 85, the toe-out of rear wheel 1 is disturbed. Then, a reaction of the force for exerting toe-out operation of rear wheel 1 is strongly acted on rod 20 by the operation of the moment around central point O at this time. As a result, rod 20 is effected by tensile force. Thus, rod 20 performs a function as one of the suspension arms for controlling the operation of rear wheel 1, and crossing point Q between the operating line of rod 20 and the center line of arms 7a, 7b act as simulated momentary central point. Since point Q is disposed inward in the lateral direction of the vehicle from the central axis of rear wheel 1, rear wheel 1 exerts toe-in operation by the operation of the moment around the simulated momentary central point Q. Since the displacement of the vicinity of shaft 11 of arm 6 to the vehicle body side in the axial direction of link 8 is absorbed by the deformation of bushing 70, the above-mentioned toe-in operation is not disturbed by the presence of arm 8, nor an interference of links occurs between arm 8 and rod 20.

When actuator 61 is operated to displace piston rods 63, 64 in the lateral direction of the vehicle, rod 20 displaces the front end of arm 9 in the lateral direction of the vehicle. Thus, arm 9 is inclined to steer the rear wheel 1 in the same manner as the first and second embodiments. The steering angle of the rear wheel obtained by operating actuator 61 is sufficiently large as compared with the toe-in amount with rapid responsiveness irrespective of the presence of bushing 81 to set the stroke of actuator 61 to steer the rear wheel.

According to the third embodiment as described above, the rear wheel is not only steered by the operation of actuator 61, but actuator 61 exerts the rear wheel in the toe-in operation by varying the momentary central point of the suspension actuation between both cases that brake force Br or lateral force F is acted on the rear wheel and drive force T is acted can be provided to improve the traveling safety of the vehicle. The same advantages as those in the first and second embodiments can be also provided.

Figure 14:
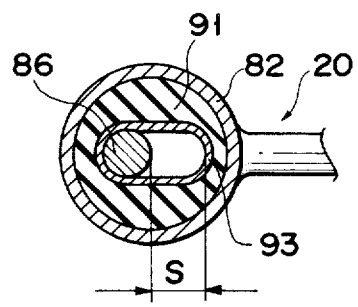
FIG. 14 is a sectional view of a modified bushing similar to that shown in FIG. 11.

The present invention is not limited to the particular embodiments as described above. Various changes and modifications may be made within the spirit and scope of the present invention. For example, bushing 91 for externally engaging inner cylindrical collar 93 having a long hole may be formed in bushing 91 as shown in FIG. 14. In this case, pivotal shaft 86 provided at arm 6 side is disposed outward of the lateral direction of the vehicle at normal operation time of the suspension to necessarily displace only in the inward direction of the vehicle body of the vicinity of shaft 11 of arm 6 by an initial clearance S provided in the iwnard direction in the lateral direction of the vehicle.

Figure 15:
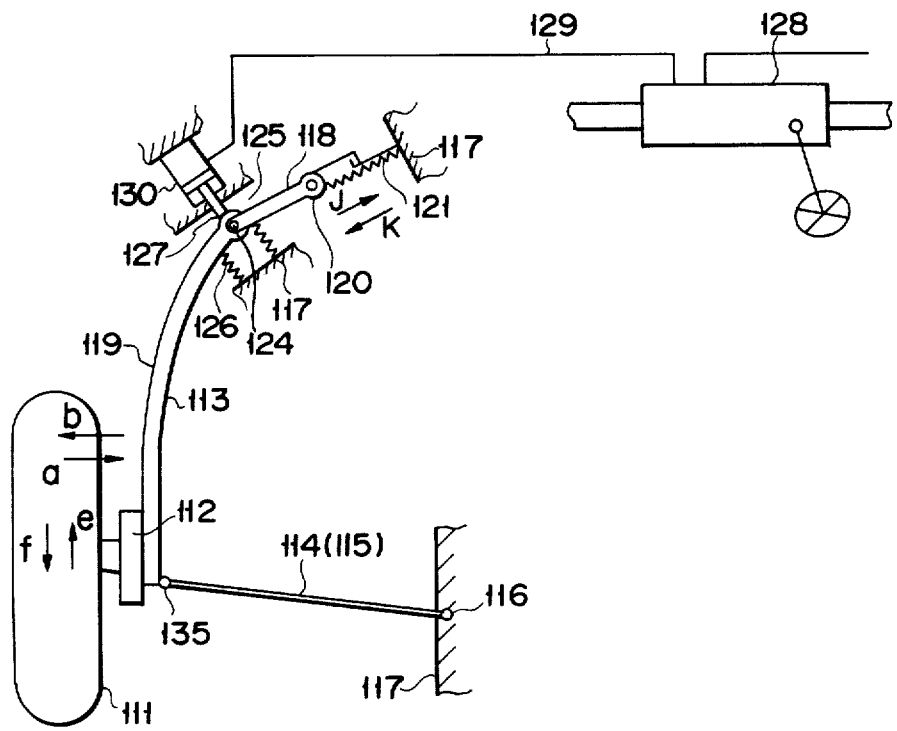
FIG. 15 is a schematic plan view of a fourth embodiment according to the invention.
Figure 16:
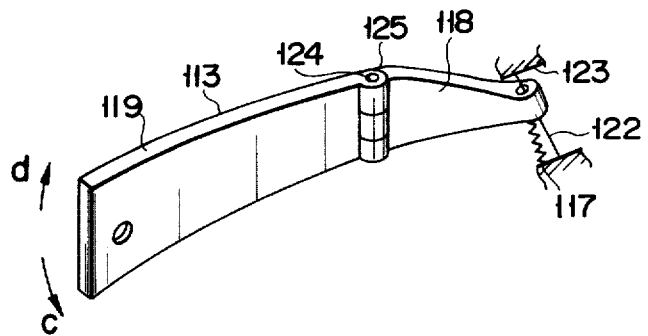
FIG. 16 is a perspective view of a trailing arm of the fourth embodiment.
Figure 17:
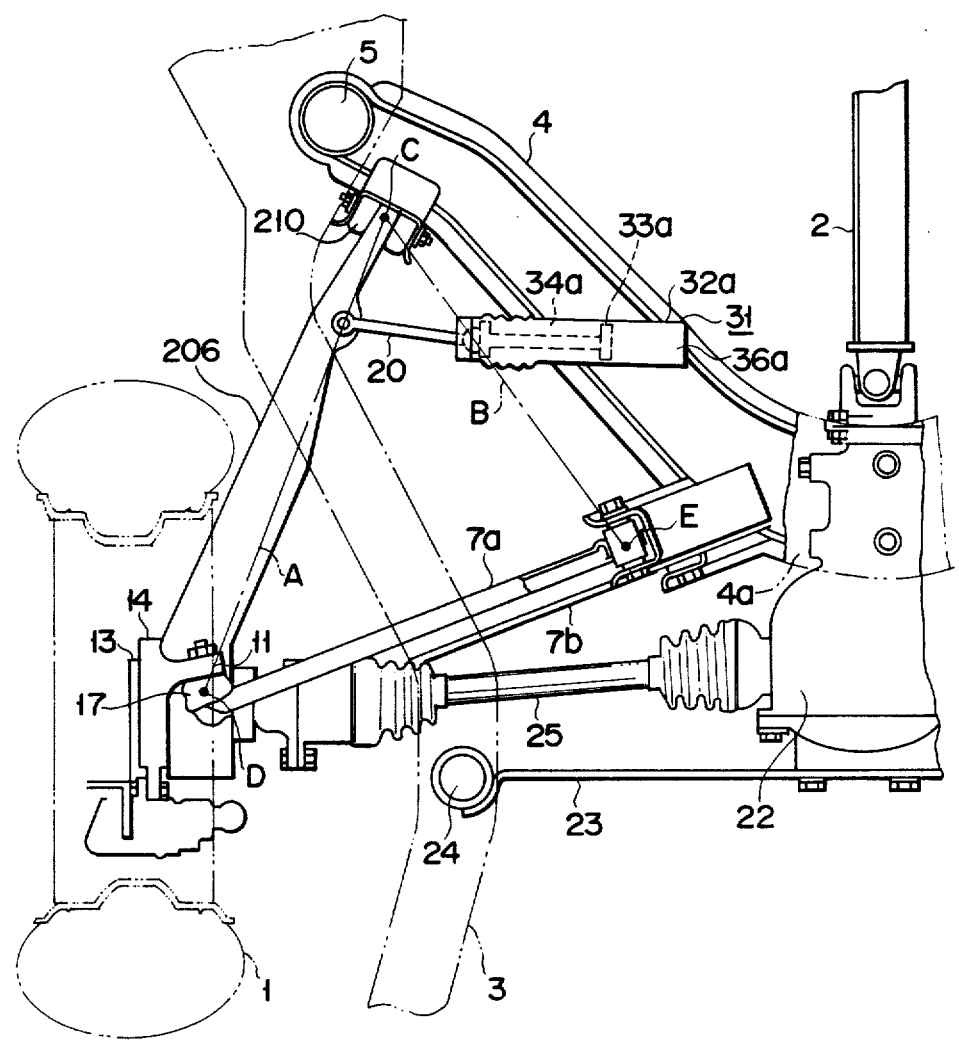
FIG. 17 is a plan view showing the schematic construction of a fifth embodiment of a rear wheel steering system.

FIGS. 15 and 16 show a fourth embodiment of the present invention. FIGS. 15 and 16 show the schematic construction of a rear wheel steering system according to the present invention. Numeral 111 designates a rear wheel, mounted on hub carrier 112. Hub carrier 112 is fixed to the rear end of trailing arm 113 extending in the longitudinal direction of the vehicle. Arm 113 is supported by a pair of upper and lower lateral arms 114 and 115 (only one of which is shown) extending essentially in the lateral direction of the vehicle at the rear side of wheel 111 through a ball joint 135. The inner ends of arms 114, 115 are pivotally secured to arm 113 via bushing 116 to vehicle body 117. Arm 113 is split into body side arm 118 and wheel side arm 119. Arm 118 has at one end thereof annular portion 120 to become a vehicle side mounting portion, and bushing 121 is provided in annular portion 120. In other words, arm 113 is supported to body 117 through bushing 121, which has a spring constant smaller for lateral force "a" inward of the vehicle body and larger for lateral force "b" outward of the vehicle body.

Thus, when the suspension strokes in the extending side, i.e., downward force "c" is acted, annular portion 120 moves downward along shaft 122 to move inward in the lateral direction of the vehicle, so that wheel 111 is steered to be made in the toe-in operation, and when the suspension strokes in the contracting stroke, i.e., upward force "d" is acted, annular portion 120 contacts stopper 123 to restrict the outward movement in the lateral direction of the vehicle, so that wheel 111 is restricted so as to exert the toe-out operation. Wheel side arm 119 is rotatably connected to the other end of vehicle body side arm 118 supported at one end thereof to body 117 via pivotal shaft 124 having an axial center in the vertical direction. Thus, arms 118 and 119 are so disposed that the angle formed between arms 118 and 119 in the horizontal plane is obtuse (nore than 90°) at body 117 side. Further, the insides of both arms 118, 119 at pivotally securing portions 125 are supported to body 117 through bushings 126. Since the rear end of arm 113 is supported to arms 114, 115 through ball joint 135, the front portion of arm 113 is allowed to displace in the lateral direction of the vehicle by the resilient deformation of bushings 121, 126 and the relative rotation of arms 119, 118.

Further, stopper 127 for restricting the movement of arm 119 in the direction for reducing the angle is provided at body 117 outside the pivotally securing portion 125. In other words, stopper 127 communicates with pwoer steering mechanism 128 through hydraulic circuit 129 to regulate the projecting position by actuator 130 for steering the rear wheel telescoped by the hydraulic pressure.

Actuator 130 and rear wheel suspension arrangement are shown in FIG. 15 for only one side, but may be naturally provided symmetrically with right and left sides. A switching valve mechanism, not shown, is provided between power steering mechanism 128 and actuator 130. Hydraulic pressure is acted in the actuator of the inner wheel side at low speed cornering time, and acted in the actuator of the outer wheel side at high speed cornering time.

The operation of the fourth embodiment will be described. Since stopper 127 is controlled in the projecting amount by hydraulic pressure supplied to actuator 130 through hydraulic circuit 129 from mechanism 128, when stopper 127 is projected by the operation of actuator 130 as a result of steering the front wheel, the angle formed between arm 119 and arm 118 increases to deform to compress bushings 121, 126, and the front portion of arm 113 displaces entirely toward the inside of the lateral direction of the vehicle. Since arm 113 is supported at the rear end thereof to arms 114, 115, arm 113 is inclined toward the inside of the lateral direction of the vehicle, thereby steering rear wheel 111 toward the inside. When hydraulic pressure to actuator 130 is eliminated, arms 113, 111 are returned to the initial positions by the resilient deformations of bushings 121, 126.

In the fourth embodiment described above, one of the rear wheels is steered toward the inside of the vehicle body. However, even if one of the rear wheel is merely steered inside, the traveling stability and the cornering performance of the vehicle can be improved or the cornering radius of the vehicle can be sufficiently reduced. Since the outer wheel side at the cornering time of the vehicle is effected by a load much larger than that of the inner wheel side, the rear wheel steering effect can be efficiently performed merely by steering the outer wheel side toward the inside.

Since the suspension of the embodiment is mainly composed of the trailing arm 113 provided in the longitudinal direction of the vehicle and the lateral arms 114, 115 provided in the lateral direction of the vehicle, most of lateral force acting on rear wheel 111 is effected by arms 114, 115. Thus, so-called compliance steering that the rear wheel is steered in the reverse direction to the front wheel is prevented by the lateral force during the turning of the vehicle. Therefore, even if actuator 130 or hydraulic circuit fails during high speed cornering time of the vehicle, the compliance of the front portion of arm 113 due to the displacement in the lateral direction of the vehicle can be suppressed to enhance the safety.

Further, even if rear wheel 111 is disposed at the inner wheel side at the cornering time of the vehicle so that an external force b acts with the result that arm 113 tends to move toward the outside, the movement of arm 118 can be restricted by bushing 121 of arm 118. Since arm 119 of arm 113 is mounted through flexible bushing 121 in the inward direction of the vehicle body at the body 117, rear wheel 111 is disposed at the outer wheel side at the cornering time, and when inward force "a" is applied, arm 113 moves toward the inward direction of the vehicle body, and rear wheel 111 exerts in the toe-in effect.

Therefore, when actuator 130 is not acted since rear wheel 111 is exerted in the toe-in effect at the outer wheel side in addition to the suppression of the compliance steering due to the lateral arms and the toevariation of the inner wheel side is restricted, the oversteering can be effectively prevented due to the displacement of the rear wheel in the reverse direction to the front wheel.

When a brake force is applied to the vehicle, backward force "f" is applied to body 117, and since the pivotally securing portion 125 of arm 118 of arm 113 and arm 119 compresses bushing 126 to move to body 117 side, wheel 111 is exerted in the toe-in effect.

When forward force "e" is acted at wheel 111, arm 113 tends to move forward, but pivotally securing portion 125 of arm 119 contacts stopper 127 to restrict the movement thereof. Thus, the toe-out of wheel 111 supported to arm 119 can be restricted. In the fourth embodiment described above, the rear wheel steering system can be provided in the same manner as the first embodiment merely by adding a simple construction to the rear suspension to reduce the cost, and even if the actuator or hydraulic system fails, the oversteering trend can be prevented at high speed cornering time of the vehicle to improve the safety. Further, the fourth embodiment can readily settle rear wheel steering function with excellent productivity, can provide large steering angle than the conventional steering system even by the actuator of small size having small acting force, thereby compatibly providing the preferable operation of the suspension and the steering of the rear wheel.

FIGS. 17 to 20 show a fifth embodiment of the present invention, wherein the same reference numerals as in the first embodiment denote the same parts in the first embodiment, and the detailed description thereof will be omitted.

Figure 19:
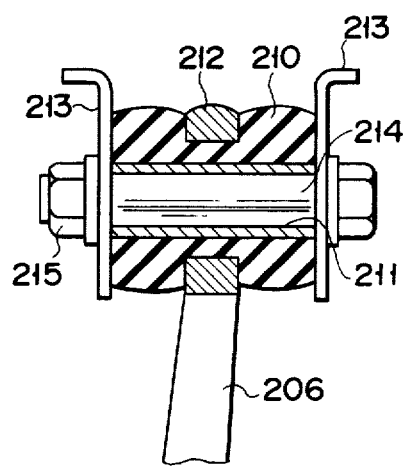
FIG. 19 is a sectional view of the essential portion showing the pivotally securing state of the trailing arm to a vehicle body side.

In the fifth embodiment, trailing arm 206 of integral construction is provided instead of trailing arm 6 of split construction of the first embodiment. Arm 206 is pivotally secured at the front end thereof to cross member 4 through bushing 210 of large capacity. The detailed constuction of the pivotally securing portion is shown in FIG. 19. Bushing 210 is formed in a drumshaped cylindrical state, and metallic collar 211 is inserted into the inner peripheral side thereof. An annular portion 212 formed at the front end of arm 206 is externally engaged with outer peripheral recess of bushing 210, and pivotally secured to bracket 213 fixed to member 4 by bolt 214 and nut 215. Bushing 210 is formed of a flexible material so that the outer projections of both sides have sufficiently large capacity for the recesses. Thus, the front end of arm 206 is allowed to displace in the lateral direction of the vehicle by the resilient deformation of bushing 210. Bushing 210 is largely flexible as compared with bushings interposed between links 7a, 7b and member 4.

Rod 20 coupled with actuator 31 is connected with the front end of arm 206, and the front end of arm 206 displaces in the lateral direction of the vehicle while deforming bushing 210 by the operation of actuator 31 controlled by a hydraulic circuit in the same manner as that shown in FIG. 6 or 9, thereby steering rear wheel 1.

According to the construction described above of the fifth embodiment, bushing 210 provided between the front end of arm 206 and member 4 of the body side is formed with large capacity and to be flexible to allow arm 206 to displace in the lateral direction of the vehicle, thereby steering rear wheel 1 in the same manner as the first embodiment.

Since arm 206 extending longitudinally by supporting rear wheel 1 at the rear portion thereof mainly bears the longitudinal force acting on the rear wheel, the riding feeling of the vehicle can be improved by forming bushing 210 with large capacity to be flexible. Since the resilience of a bushing provided at the body side support of arms 7a, 7b is not set to a low value in case of steering the rear wheel, the lateral force acting on the rear wheel in case of cornering the vehicle is effectively supported by arms 7a, 7b extending in the lateral direction of the vehicle so that the compliance steering phenomenon that the rear wheel is steered in the reverse direction to the front wheel due to the displacement of the rear wheel is prevented. The lateral force acting slightly on arm 206 at this time deforms bushing 210 so that rear wheel 1 is steered in the same direction as the front wheel to displace the front end of arm 206. Thus, even if actuator 31 or hydraulic circuit is, for example, fails so that the rear wheel 1 can not be steered, an oversteering phenomenon that the rear wheel is steered in the reverse direction to the front wheel by the lateral force acting on the rear wheel 1 at the cornering time can be eliminated to improve the traveling stability of the vehicle.

According to the fifth embodiment described above, the rear wheel can be steered by more simple construction than that of the first embodiment, thereby providing excellent rising feeling.

Even if actuator 31 or the hydraulic system fails, the traveling stability is not lost in the same manner as the first embodiment to provide excellent safety and the same advantages as those in the first embodiment may be performed.

Figure 20:
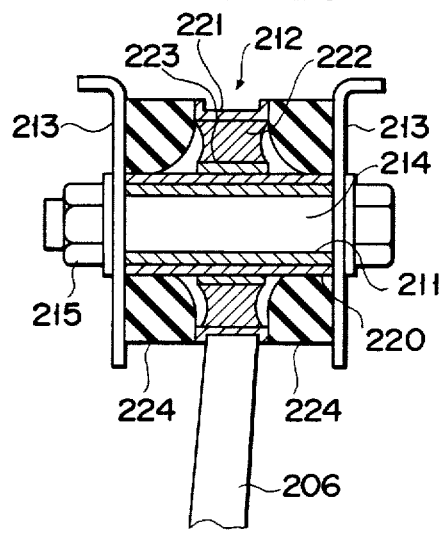
FIG. 20 is a sectional view of a modified bushing similar to that shown in FIG. 19.

FIG. 20 shows the modified example of a bushing of the fifth embodiment.

In 'FIG. 20, numeral 220 designates a resin collar externally engaged with metal collar 211, numerals 221 an outer annular portion provided integrally with the front end of arm 206, numeral 222 an annular bushing fixedly engaged inwardly in the outer annular portion, numeral 223 an inner annular portion inwardly engaged with bushing 222 and externally engaged slidably with collar 220, and numeral 224 two bushings externally engaged with collar 220 between the annular portion 212 of arm 206 and bracket 213.

The longitudinal force acting on arm 206 with the construction described above bears by the resilience of bushing 222, and the displacement of the front portion of arm 206 in the lateral direction of the vehicle is allowed by the resilient deformation of bushing 224. Thus, since the attenuating force for the longitudinal force and the degree of displacement can be independently set by separate bushings 222, 224, the degree of tolerance of arm 206 is increased to simply provide most preferable characteristics in the vehicle.

Since inner annular portion 223 of arm 206 is slid with collar 220 so that 206 is displaced in the lateral direction of the vehicle, arm 206 can be displaced more smoothly than the fourth embodiment, thereby providing smooth steering of the rear wheel.

The present invention is not limited to the particular embodiments described above. Various other changes and modifications may be made within the spirit and scope of the present invention.

According to the prsent invention as described above together with the embodiments, even when the actuator or hydraulic system fails so that the steering of the rear wheel becomes impossible, it can prevent deterioration of the operabilty due to the oversteering at the cornering time, thereby providing excellent safety.

The rear wheel steering system can be provided with a simple construction and the actuator can be reduced in size to improve the responsiveness and the steering amount of steering the rear wheel.

Further, the steering system can eliminate the linkage interference between the lateral links and the tie rod to smoothly move the upward and downward strokes of the suspension and to properly control the steering angle of the rear wheel.

What is claimed is:

1. A rear wheel steering system comprising:
   a trailing arm having a rear portion connected to the rear wheel for rotatably supporting the rear wheel, said trailing arm having a front end pivotally coupled to a vehicle body, and extending substantially longitudinally of the vehicle body;
   upper and lower lateral arms having lateral outward ends pivotally coupled to the rear portion of the trailing arm by means of a ball joint, and lateral inward ends pivotally coupled to the vehicle body; and
   steering means having one end pivotally coupled to the trailing arm, for displacing the trailing arm,
   said trailing arm including a first arm having front and rear ends, said front end pivotally coupled to the vehicle body, and a second arm having front and rear ends, said rear end coupled to the wheel,
   said rear end of the first arm and said front end of the second arm being pivotally coupled to each other and forming an angle therebetween and said rear end of the second arm being pivotally coupled to each of the lateral outward ends of said lateral arms,
   said steering means being capable of moving said trailing arm in a plane of the vehicle body to thereby control the angle formed between said first arm and said second arm.

2. The rear wheel steering system according to claim 1, wherein said steering means comprises a tie rod having an axis extending laterally of the vehicle body, and an actuator for moving said tie rod laterally, said tie rod having a lateral outward end pivotally coupled to said trailing arm at a portion adjacent to the coupled joint between said first arm and said second arm.

3. The rear wheel steering system according to claim 1, wherein said steering means comprises a tie rod having an axis extending laterally of the vehicle body, and an actuator for moving said tie rod laterally, said tie rod having a lateral outward end pivotally coupled to said trailing arm, such that the pivotally coupled portion is located on a line extending from the pivotally coupled portion of said trailing arm with the vehicle body to the pivotally coupled portion of said lateral arm with the rear wheel, said tie rod having a lateral inward end pivotally coupled to said actuator, such that the pivotally coupled portion is located on a line extending from the pivotally coupled portion of said trailing arm with the vehicle body to the pivotally coupled portion of said lateral arm with the vehicle body.

4. The rear wheel steering system according to claim 1, wherein said steering means comprisies a pair of tie rods each having an axis extending laterally of the vehicle body, and an actuator for moving said tie rods in an axial direction thereof, said tie rods each having a lateral outward end pivotally coupled to said trailing arm, and a lateral inward end pivotally coupled to said actuator, said actuator being capable of moving said pair of tie rods concurrently.

5. The rear wheel steering system according to claim 4, wherein said second arm, said lateral arms and said tie rods are arranged such that a line extending from said first arm and a line extending from said lateral arm cross at a point laterally outward of the center of the rear wheel in the plane of the vehicle body, and that a line extending form said tie rod and a line extending from said lateral arm cross at a point laterally inward of the center of the rear wheel in the vehicle body plane, wherein the pivotally coupled portion of said tie rod allows lateral inward displacement of the coupled joint between said first arm and said second arm, and regulates lateral outward displacement of said coupled joint, said coupled joint being allowed to move toward the vehicle body in an axial direction of said first arm.

6. The rear wheel steering system according to claim 1, wherein said steering means comprises a stopper provided laterally outwardly of said trailing arm, and an actuator for projecting and retracting said stopper, said stopper regulating laterally outward displacement of said trailing arm, so that the angle formed laterally inwardly between said first arm and said second arm does not decrease.

* * * * *

UNITED STATES PATENT AND TRADEMARK OFFICE
CERTIFICATE OF CORRECTION

PATENT NO. : 4,709,935
DATED : December 1, 1987
INVENTOR(S) : Shozo Takizawa et al.

It is certified that error appears in the above—identified patent and that said Letters Patent is hereby corrected as shown below:

Column 16, line 31, cancel "form" and insert --from--.

Signed and Sealed this

Twenty-eighth Day of June, 1988

Attest:

DONALD J. QUIGG

*Attesting Officer*

*Commissioner of Patents and Trademarks*